United States Patent
Kim et al.

(10) Patent No.: US 12,453,381 B2
(45) Date of Patent: Oct. 28, 2025

(54) AEROSOL GENERATING DEVICE AND CONTROL METHOD THEREOF

(71) Applicant: KT&G CORPORATION, Daejeon (KR)

(72) Inventors: Yong Hwan Kim, Gyeonggi-do (KR); Sung Wook Yoon, Gyeonggi-do (KR); Seung Won Lee, Gyeonggi-do (KR); Dae Nam Han, Seoul (KR)

(73) Assignee: KT&G CORPORATION, Daejeon (KR)

( * ) Notice: Subject to any disclaimer, the term of this patent is extended or adjusted under 35 U.S.C. 154(b) by 434 days.

(21) Appl. No.: 17/909,210

(22) PCT Filed: Apr. 20, 2021

(86) PCT No.: PCT/KR2021/004954
§ 371 (c)(1),
(2) Date: Sep. 2, 2022

(87) PCT Pub. No.: WO2021/215797
PCT Pub. Date: Oct. 28, 2021

(65) Prior Publication Data
US 2023/0108105 A1 Apr. 6, 2023

(30) Foreign Application Priority Data
Apr. 22, 2020 (KR) ........................ 10-2020-0048857

(51) Int. Cl.
*A24F 40/53* (2020.01)
*A24F 40/51* (2020.01)
(Continued)

(52) U.S. Cl.
CPC .............. *A24F 40/53* (2020.01); *A24F 40/51* (2020.01); *A24F 40/57* (2020.01); *A24F 40/10* (2020.01); *A24F 40/60* (2020.01); *A24F 40/90* (2020.01)

(58) Field of Classification Search
None
See application file for complete search history.

(56) References Cited

U.S. PATENT DOCUMENTS

| 11,589,420 | B2 | 2/2023 | Takeuchi et al. | |
| 2015/0237917 | A1* | 8/2015 | Lord | G01K 1/20 |
| | | | | 131/328 |

(Continued)

FOREIGN PATENT DOCUMENTS

| CN | 103338663 A | * 10/2013 | ............... A24D 3/17 |
| CN | 103974638 A | 8/2014 | |

(Continued)

OTHER PUBLICATIONS

English Translation of KR_20190129758 (Year: 2019).*
(Continued)

*Primary Examiner* — Manley L Cummins, IV
(74) *Attorney, Agent, or Firm* — Sughrue Mion, PLLC

(57) ABSTRACT

An aerosol generating device includes: a heater configured to heat an aerosol generating material to generate an aerosol; a battery configured to supply power to the heater; a controller configured to determine an operating state of the aerosol generating device divided into a heating state and a non-heating state; a first circuit unit configured to control operation of the heater; and a second circuit unit configured to control charging and discharging of the battery, wherein the controller communicates with the first circuit unit in the heating state, communicates with the second circuit unit in the non-heating state, and, on the basis of a result of the communication, determines whether or not an abnormality (Continued)

has occurred according to the operating state of the aerosol generating device, thus allowing a safety accident of the aerosol generating device to be prevented in advance.

13 Claims, 6 Drawing Sheets

(51) Int. Cl.
*A24F 40/57* (2020.01)
*A24F 40/10* (2020.01)
*A24F 40/60* (2020.01)
*A24F 40/90* (2020.01)

(56) References Cited

U.S. PATENT DOCUMENTS

| | | |
|---|---|---|
| 2017/0119052 A1 | 5/2017 | Williams et al. |
| 2017/0251725 A1 | 9/2017 | Buchberger et al. |
| 2018/0301915 A1 | 10/2018 | Colotte et al. |
| 2018/0335280 A1 | 11/2018 | Flick |
| 2019/0208822 A1 | 7/2019 | Mullin |
| 2019/0380395 A1 | 12/2019 | Takeuchi et al. |
| 2019/0387801 A1 | 12/2019 | Takeuchi et al. |
| 2020/0281277 A1 | 9/2020 | Akao et al. |
| 2021/0076736 A1 | 3/2021 | Fernando et al. |
| 2021/0243842 A1 | 8/2021 | Kondo |
| 2022/0322746 A1 | 10/2022 | Talon |
| 2023/0208160 A1* | 6/2023 | Colotte .................. A24F 40/57 |

FOREIGN PATENT DOCUMENTS

| | | |
|---|---|---|
| CN | 108882749 A | 11/2018 |
| EP | 3 791 742 A1 | 3/2021 |
| JP | 2019-526889 A | 9/2019 |
| JP | 2020-61361 A | 4/2020 |
| KR | 20-2007-0000689 U | 6/2007 |
| KR | 10-2010-0069327 A | 6/2010 |
| KR | 10-2011-0096548 A | 8/2011 |
| KR | 10-2015-0128173 A | 11/2015 |
| KR | 10-1570876 B1 | 11/2015 |
| KR | 10-2019-0003842 A | 1/2019 |
| KR | 10-2019-0113905 A | 10/2019 |
| KR | 10-2019-0116533 A | 10/2019 |
| KR | 10-2019-0119083 A | 10/2019 |
| KR | 10-2019-0129758 A | 11/2019 |
| KR | 10-2020-0003230 A | 1/2020 |
| RU | 2607067 C2 | 1/2017 |
| WO | 2014/060267 A2 | 4/2014 |
| WO | 2019/07708 A1 | 4/2019 |

OTHER PUBLICATIONS

English Translation of CN_103338663 (Year: 2013).*
Office Action dated Dec. 26, 2022 from the Russian Federal Service for Intellectual Property in RU Application No. 2022121716/03.
Korean Notice of Non-Final Rejection for KR 10-2020-0048857 dated Oct. 25, 2021.
Korean Notice of Final Rejection for KR 10-2020-0048857 dated Apr. 25, 2022.
International Search Report for PCT/KR2021/004954 dated Jul. 30, 2021.
Written Opinion for PCT/KR2021/004954 dated Jul. 30, 2021.
Korean Office Action dated Jul. 2, 2023 in Application No. 10-2022-0159563.
Office Action issued Jan. 21, 2025 in Japanese Application No. 2024-066109.
Office Action issued Apr. 1, 2025 in Chinese Patent Application No. 202180013869.8.

* cited by examiner

[Fig. 1]
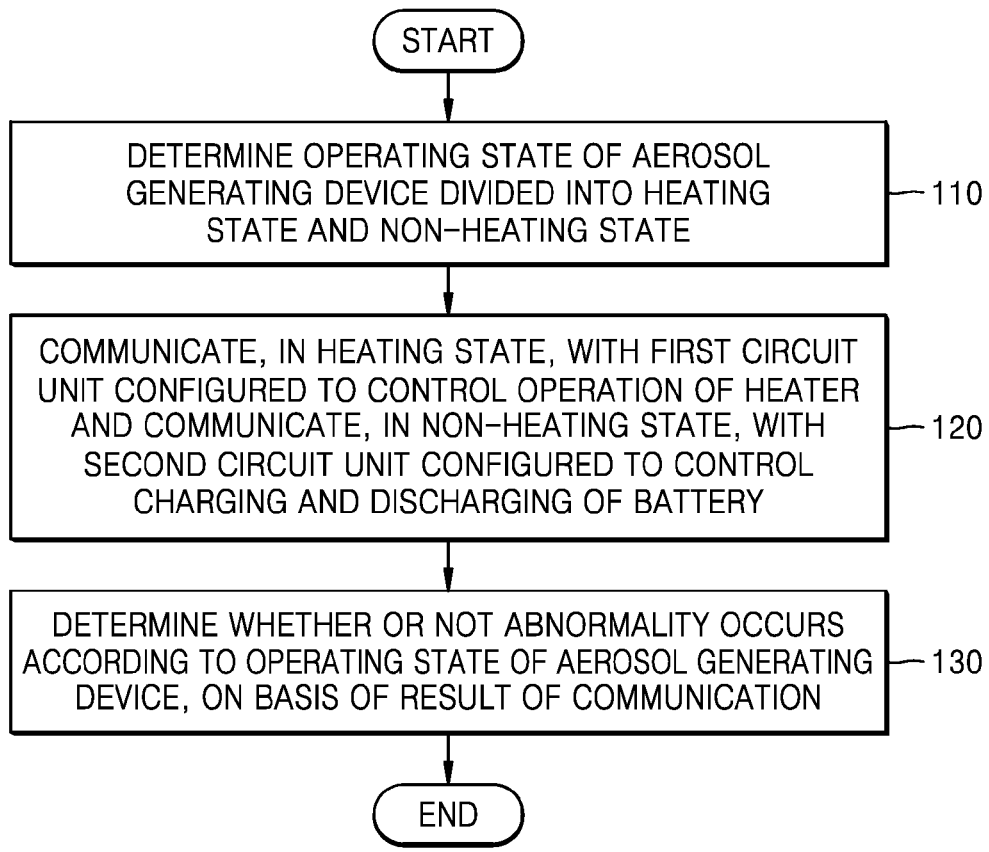

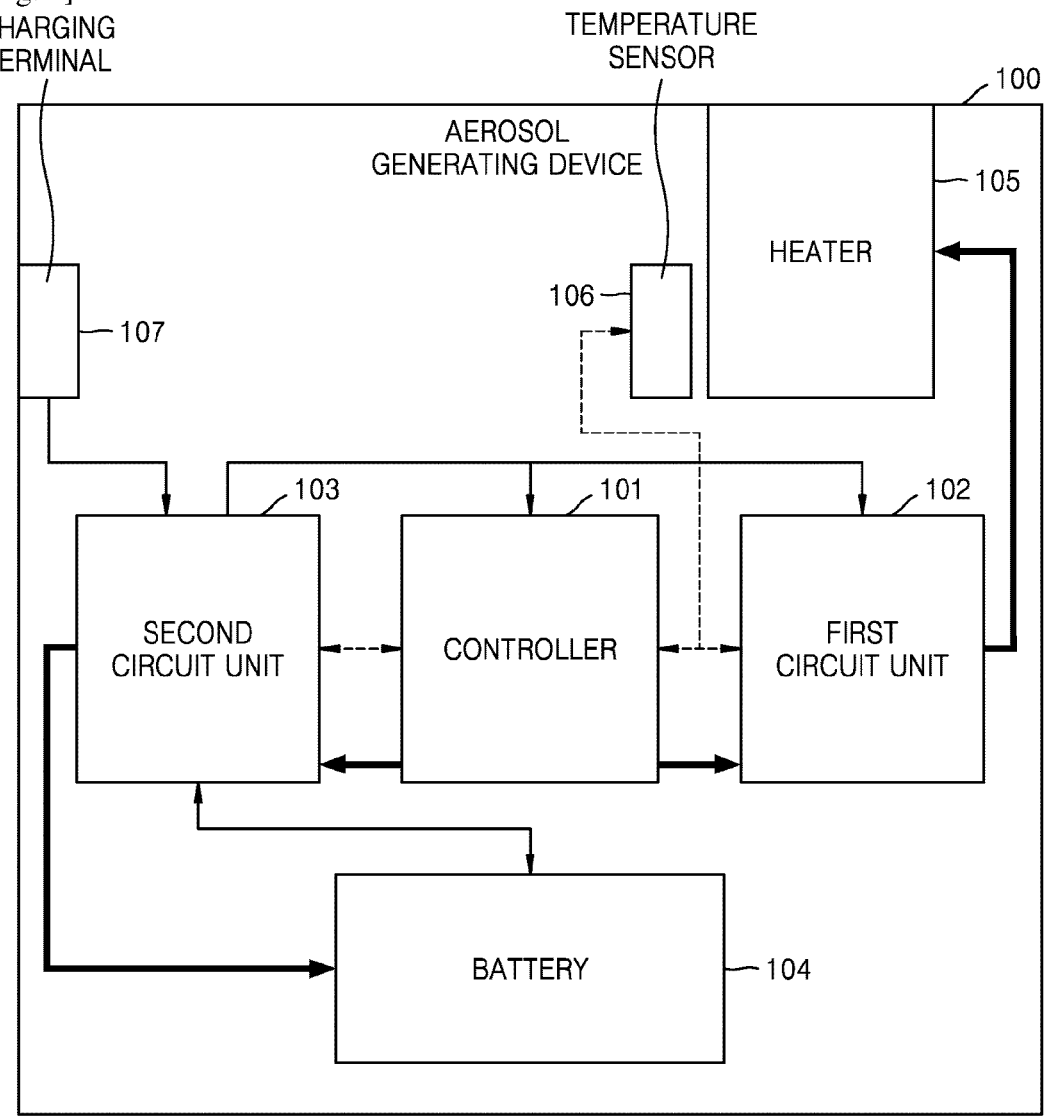
[Fig. 2]
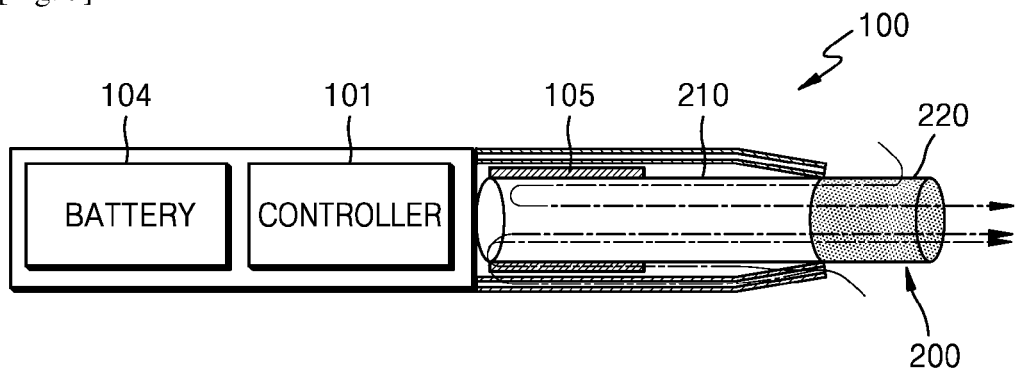
[Fig. 3]

[Fig. 4]
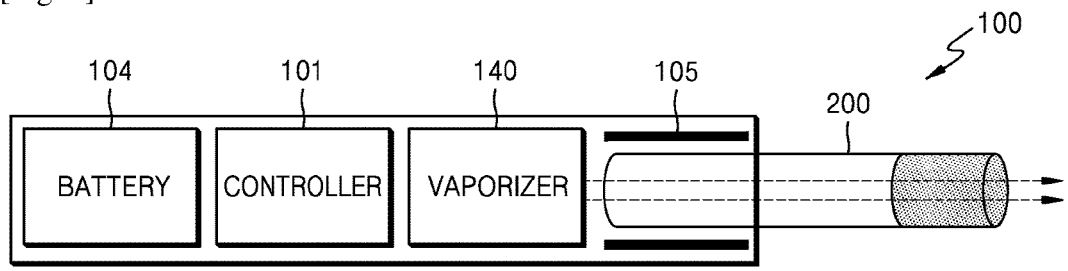
[Fig. 5]
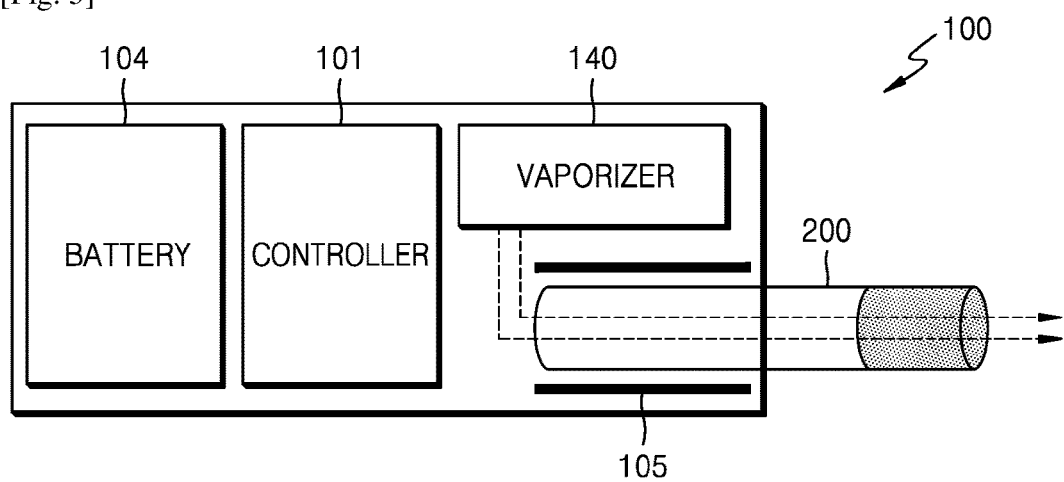
[Fig. 6]
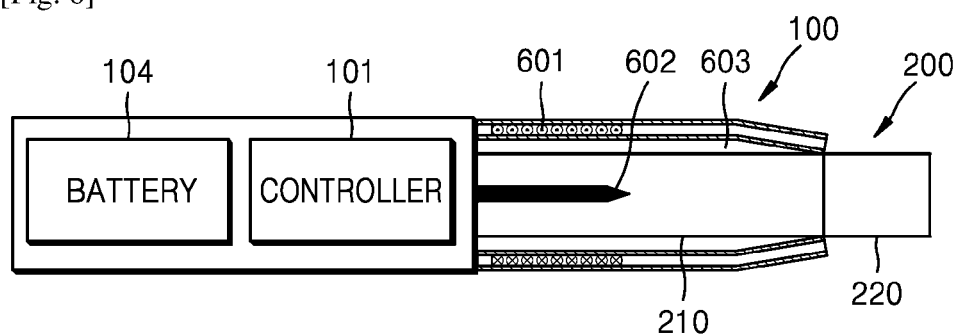
[Fig. 7]
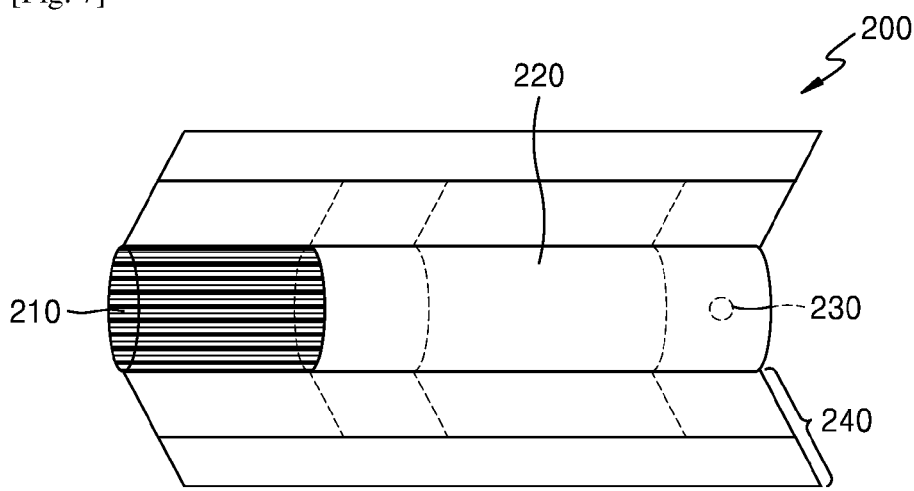

[Fig. 8]
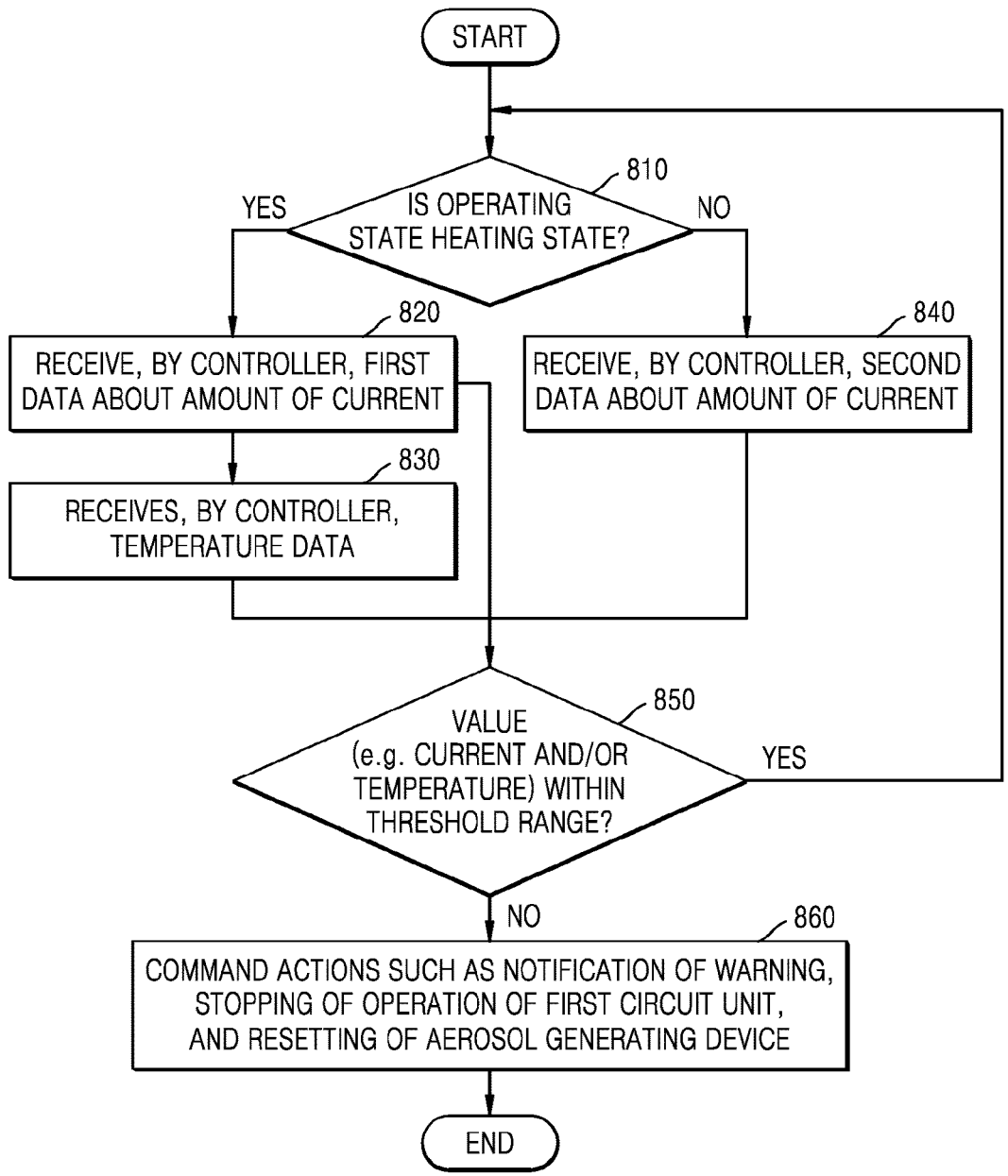

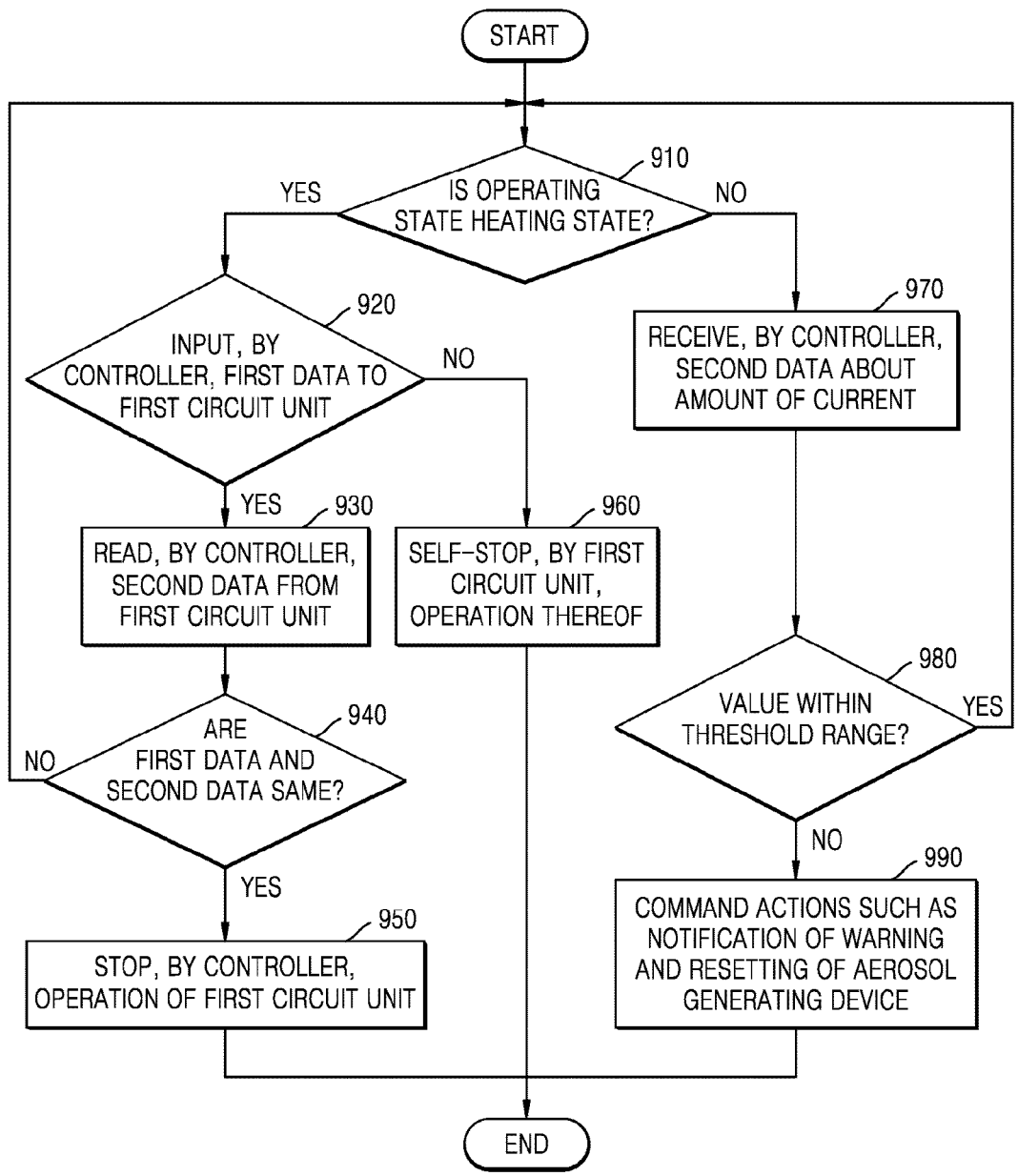

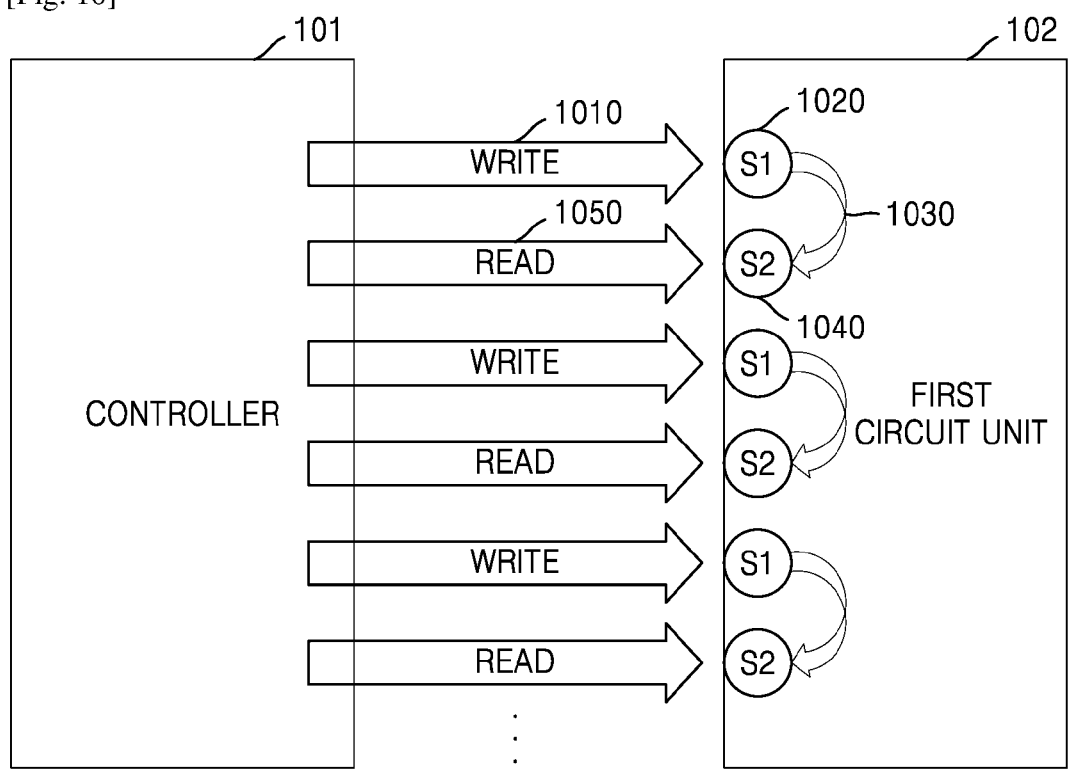
[Fig. 10]

AEROSOL GENERATING DEVICE AND CONTROL METHOD THEREOF

CROSS REFERENCE TO RELATED APPLICATIONS

This application is a National Stage of International Application No. PCT/KR2021/004954 filed Apr. 20, 2021, claiming priority based on Korean Patent Application No. 10-2020-0048857 filed Apr. 22, 2020.

TECHNICAL FIELD

One or more embodiments of the present disclosure relate to an aerosol generating device and a control method thereof.

BACKGROUND ART

Recently, the demand for alternative methods of overcoming the shortcomings of general cigarettes has increased. However, because current for heating flows inside an aerosol generating device in both a method of using a heated cigarette and a method of heating a heated aerosol generating material, a defect or an operation error occurs in the aerosol generating device. Therefore, an aerosol generating device may operate ab-normally, and thus, accidents may occur due to overheating or overcurrent of the aerosol generating device.

As the risk of such accidents has become socially recognized, the need for a safety device and consumer demand for an aerosol generating device equipped with a safety device have also increased. An aerosol generating device to which a more precise control method is applied than in an existing aerosol generating device is needed so as not to be exposed to such risk.

DISCLOSURE OF INVENTION

Technical Problem

An electronic aerosol generating device may be in a dangerous situation due to overheating, short circuit, overcurrent, overcharging of a battery, and the like according to situations.

Problems to be solved through one or more embodiments of the present disclosure are not limited to the above-described problems, and the problems that have not been mentioned may be clearly understood by one of ordinary skill in the art from the description, claims, and accompanying drawings.

Solution to Problem

One or more embodiments of the present disclosure include an aerosol generating device and a control method thereof. One or more embodiments of the present disclosure include an aerosol generating device capable of preventing a safety accident in advance by detecting an abnormal situation, as described above, that may occur in an aerosol generating device.

According to one or more embodiments, an aerosol generating device includes: a heater configured to heat an aerosol generating material to generate an aerosol; a battery configured to supply power to the beater; a controller configured to determine an operating state of the aerosol generating device divided into a heating state and a non-heating state; a first circuit unit configured to control operation of the heater; and a second circuit unit configured to control charging and discharging of the battery, wherein the controller communicates with the first circuit unit in a heating state, communicates with the second circuit unit in a non-heating state, and, on the basis of a result of the communication, determines whether or not an abnormality has occurred according to the operating state of the aerosol generating device.

According to one or more embodiments, a method of controlling an aerosol generating device includes: determining an operating state of the aerosol generating device divided into a heating state and a non-heating state; on the basis of the operating state of the aerosol generating device, communicating, in the heating state, with a first circuit unit configured to control operation of a heater and communicating, in the non-heating state, with a second circuit unit configured to control charging and discharging of a battery; and on the basis of a result of the communication, determining whether or not an abnormality has occurred according to the operating state of the aerosol generating device.

Advantageous Effects of Invention

According to one or more embodiments, the stability of an aerosol generating device may be secured in a dangerous situation due to overheating of the aerosol generating device, short circuit, overcurrent, overcharging of a battery, or the like.

In addition, a controller and a first circuit unit for controlling a heater may be separately configured. Therefore, the first circuit unit may self-stop operation thereof even when the controller malfunctions, thereby avoiding abnormal overheating.

The effects to be achieved by one or more embodiments of the present disclosure are limited to the above-described effects, and the effects that have not been mentioned may be clearly understood by one of ordinary skill in the art from the description, claims, and accompanying drawings.

BRIEF DESCRIPTION OF DRAWINGS

FIG. 1 is a flowchart of determining whether or not an abnormality has occurred in an aerosol generating device.

FIG. 2 is a schematic conceptual diagram of an aerosol generating device.

FIG. 3 is a diagram illustrating a first example in which a cigarette is inserted into an aerosol generating device.

FIG. 4 is a diagram illustrating a second example in which a cigarette is inserted into an aerosol generating device.

FIG. 5 is a diagram illustrating a third example in which a cigarette is inserted into an aerosol generating device.

FIG. 6 is a diagram illustrating a fourth example in which a cigarette is inserted into an aerosol generating device.

FIG. 7 is a view illustrating an example of a cigarette.

FIG. 8 is a flowchart of determining whether or not an aerosol generating device is abnormal, on the basis of data about an amount of current, according to one embodiment.

FIG. 9 is a flowchart of determining whether or not an aerosol generating device is abnormal, on the basis of a result of communication, according to one embodiment.

FIG. 10 is a conceptual diagram for explaining a method of communication between a controller and a first circuit unit, according to one embodiment.

BEST MODE FOR CARRYING OUT THE INVENTION

According to one or more embodiments, an aerosol generating device includes: a heater configured to heat an aerosol generating material to generate an aerosol; a battery configured to supply power to the heater; a controller configured to determine an operating state of the aerosol generating device divided into a heating state and a non-heating state; a first circuit unit configured to control operation of the heater; and a second circuit unit configured to control charging and discharging of the battery, wherein the controller communicates with the first circuit unit in a heating state, communicates with the second circuit unit in a non-heating state, and, on the basis of a result of the communication, determines whether or not an abnormality has occurred according to the operating state of the aerosol generating device.

The controller may monitor whether or not an amount of current greater than or equal to a certain value is flowing through the first circuit unit and, on the basis of a result of the monitoring, determine the operating state of the aerosol generating device as one of the beating state and the non-heating state.

The controller may receive first data about an amount of current flowing through the first circuit unit when the operating state of the aerosol generating device is determined as the heating state, receive second data about an amount of current flowing through the second circuit unit when the operating state of the aerosol generating device is determined as the non-heating state, determine whether or not an abnormality has occurred in the first circuit unit, on the basis of the first data about an amount of current, and determine whether or not an abnormality has occurred in the second circuit unit, on the basis of the second data about an amount of current.

The controller may determine whether or not an abnormality has occurred in the first circuit unit by comparing the first data about an amount of current with a first threshold range and determine whether or not an abnormality has occurred in the second circuit unit by comparing the second data about an amount of current with a second threshold range.

The non-beating state may be divided into a charging state and an idle state, and the second threshold range may be differently designated when the operating state is the charging state and when the operating state is the idle state.

The aerosol generating device may further include a temperature sensor configured to measure a temperature of the heater, wherein, when the operating state is the heating state, the controller acquires temperature data from the temperature sensor and determines whether or not an abnormality has occurred, on the basis of the first data about an amount of current and the temperature data.

When the controller determines that an abnormality has occurred in the aerosol generating device, the controller may give one command from among a warning notification, stopping of operation of the first circuit unit, and resetting of the aerosol generating device.

The controller may communicate with the first circuit unit by inputting data to the first circuit unit and then, after a certain time has elapsed, reading data from the first circuit unit.

The controller may compare first data input to the first circuit unit and second data read from the first circuit unit and, when the first data and the second data are the same, determine that an abnormality has occur in the first circuit unit, and stop operation of the first circuit unit.

When the first circuit unit does not receive the data from the controller, the first circuit unit may determine that an abnormality has occurred in the controller to self-stop operation thereof.

According to one or more embodiments, a method of controlling an aerosol generating device includes: determining an operating state of the aerosol generating device divided into a heating state and a non-heating state; on the basis of the operating state of the aerosol generating device, communicating, in the heating state, with a first circuit unit configured to control operation of a heater and communicating, in the non-heating state, with a second circuit unit configured to control charging and discharging of a battery; and on the basis of a result of the communication, determining whether or not an abnormality has occurred according to the operating state of the aerosol generating device.

The determining of whether or not an abnormality has occurred may include: when the operating state is the heating state, acquiring first data about an amount of current flowing through the first circuit unit and, when the operating state of the aerosol generating device is the non-heating state, acquiring second data about an amount of current flowing through the second circuit unit; and determining whether or not an abnormality has occurred in the first circuit unit, on the basis of the first data about an amount of current and determining whether or not an abnormality has occurred in the second circuit unit, on the basis of the second data about an amount of current.

The method may further include: when an abnormality is determined as having occurred in the aerosol generating device, giving one command from among a warning notification, stopping of operation of the first circuit unit, and resetting of the aerosol generating device.

The communicating, in the heating state, with the first circuit unit configured to control the operation of the heater and communicating, in the non-heating state, with the second circuit unit configured to control charging and discharging of the battery, on the basis of the operating state of the aerosol generating device, may include: inputting data to the first circuit unit; and communicating with the first circuit unit by reading data from the first circuit unit after a certain time has elapsed.

The method may further include: comparing first data input to the first circuit unit and second data read from the first circuit unit; and when the first data and the second data are the same, determining that an abnormality has occurred in the first circuit unit and stopping operation of the first circuit unit.

When the first circuit unit fails to receive data from the controller, the first circuit unit may determine that an abnormality occurs in the controller to self-stop operation thereof.

MODE FOR THE INVENTION

With respect to the terms used to describe the various embodiments, general terms which are currently and widely used are selected in consideration of functions of structural elements in the various embodiments of the present disclosure. However, meanings of the terms can be in accordance to intention, a judicial precedence, the ap-pearance of new technology, and the like. In addition, in certain cases, a term which is not commonly used can be selected. In such a case, the meaning of the term will be described in detail at the corresponding portion in the description of the present disclosure. Therefore, the terms used to describe the various embodiments of the present disclosure should be defined based on the meanings of the terms and the de-scriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

Hereinafter, embodiments of the present disclosure will now be described more fully with reference to the accompanying drawings, in which non-limiting example embodiments of the present disclosure are shown such that one of ordinary skill in the art may easily work the present disclosure. The embodiments of the present disclosure may, however, be embodied in many different forms and should not be construed as being limited to the example embodiments set forth herein.

FIG. 1 is a flowchart of determining whether or not an abnormality occurs in an aerosol generating device.

In operation 110, a controller may determine an operating state of an aerosol generating device. The operating state of the aerosol generating device may be divided into a heating state and a non-heating state.

The controller may monitor current flowing through a first circuit unit for controlling a heater, to determine the operating state. When the controller detects, on the basis of a result of the monitoring, that an amount of current greater than or equal to a certain value flows through the first circuit unit, the controller may determine the operating state as the heating state. When the controller detects that an amount of current less than the certain value flows through the first circuit unit, the controller may determine the operating state as the non-heating state.

The non-heating state may be further divided into a charging state and an idle state. When a second circuit unit receives current from an external charging device through a charging terminal, the controller may detect the same to determine the operating state of the aerosol generating device as the charging state. When the second circuit unit does not receive current from the external charging device through the charging terminal, the controller may detect as such and determine the operating state of the aerosol generating device as the idle state.

In operation 120, the controller may communicate with the first circuit unit or the second circuit unit, on the basis of the operating state of the aerosol generating device.

For example, on the basis of the operating state of the aerosol generating device, the controller may communicate with the first circuit unit in the heating state and may communicate with the second circuit unit in the non-heating state.

The controller may communicate with the first circuit unit or the second circuit unit by inputting data to the first circuit unit or the second circuit unit or by receiving data from the first circuit unit or the second circuit unit.

The communicating of the controller with the first circuit unit in the heating state and the communicating of the controller with the second circuit unit in the non-heating state on the basis of the operating state of the aerosol generating device may indicate that, according to the operating state, the controller sets a main communication target to one of the first circuit unit and the second circuit unit and periodically communicates with the circuit unit set to the main communication target.

According to one embodiment, when the aerosol generating device operates in the heating state, the controller may communicate with the first circuit unit to receive first data about an amount of current flowing through the first circuit unit. According to another embodiment, when the aerosol generating device operates in the non-heating state, the controller may communicate with the second circuit unit to receive second data about an amount of current flowing through the second circuit unit.

According to another embodiment, in the heating state, the controller may perform communication in a method of inputting first data to the first circuit and reading second data from the first circuit unit after a certain time elapses, On the basis of the first data and the second data, the controller may determine whether or not an abnormality occurs in the first circuit unit. In addition, the first circuit unit may also determine whether or not an abnormality occurs in the controller. The description thereof will be given in more detail later with reference to FIG. 10.

In operation 130, the controller may determine whether or not an abnormality occurs according to the operating state of the aerosol generating device, on the basis of a result of the communication.

The occurrence of the abnormality in the aerosol generating device may indicate that at least one of hardware components within the aerosol generating device does not operate or malfunctions.

For example, the case where the first circuit unit fails to heat the heater according to a predesigned temperature profile may indicate that an abnormality occurs due to the first circuit unit. As another example, the case where a battery is not charged even though the external charging device is connected may indicate that an abnormality occurs due to the second circuit unit.

Determining whether or not an abnormality occurs in the aerosol generating device may be performed by the controller by comparing received data with a threshold range predesignated according to each operating state. According to one embodiment, when the controller determines the operating state of the aerosol generating device as the heating state, the controller may determine whether or not an abnormality occurs in the aerosol generating device by comparing the first data about an amount of current received from the first circuit unit with a first threshold range designated appropriate for heating the heater.

According to another embodiment, when the controller determines the operating state of the aerosol generating device as the non-heating state, the controller may determine whether or not an abnormality occurs in the aerosol generating device by comparing the second data about an amount of current received from the second circuit unit with a second threshold range designated appropriate for the charging state or the idle state.

The embodiments described with reference to FIG. 1 are summarized as follows.

When the controller determines that an amount of current greater than or equal to a certain value flows through the first circuit unit, the controller may determine a state of the aerosol generating device as the heating state. In the heating state, the controller may receive, from the first circuit unit that is the main communication target, the first data about an amount of current flowing through the first circuit unit. The controller may subsequently determine whether or not an abnormality occurs in the first circuit unit, on the basis of the first data about an amount of current.

When the controller determines that an amount of current less than the certain value flows through the first circuit unit, the controller may determine the state of the aerosol generating device as the non-heating state. In the non-heating state, the controller may receive, from the second circuit unit that is the main communication target, the second data about an amount of current flowing through the second circuit unit.

The controller may subsequently determine whether or not an abnormality occurs in the second circuit unit, on the basis of the second data about an amount of current.

FIG. 2 is a schematic conceptual diagram of an aerosol generating device.

Referring to FIG. 2, an aerosol generating device 100 may include, as hardware components, a controller 101, a first circuit unit 102 (e.g. a first circuit), a second circuit unit 103 (e.g. a second circuit), a battery 104, a heater 105, a temperature sensor 106, and a charging terminal 107. However, it may be understood by one of ordinary skill in the art that the components are not limited to the components as described above and other components may be further included. In addition, each component is not limited to an arrangement structure of FIG. 2 and may be arranged in other types of structures.

The charging terminal 107 applies, to the second circuit unit 103, current received from an external charging device, in response to being connected to the external charging device. The applied current may flow to the battery 104 under control of the second circuit unit 103 to charge the battery 104.

In addition, the external charging device may use both a wired charging method and a wireless charging method. The wired charging method may use a 5-pin terminal, 8-pin terminal, or USB terminal method, and the wireless charging method may use an inductive coupling method using a magnetic field, a capacitive coupling method using an electric field, and a high frequency radiation method. However, it may be understood by one of ordinary skill in the art that the external charging device is not limited to the examples as described above, and other types of charging devices may be further included.

The battery 104 supplies power for operating the aerosol generating device 100. The battery 104 may be a rechargeable battery or a disposable battery. For example, the battery 104 may be a lithium polymer (LiPoly) battery but is not limited thereto.

In addition, the battery 104 is electrically connected to the second circuit unit 103 to be controlled to be charged and discharged by the second circuit unit 103. For example, as the current applied through the charging terminal 107 flows to the battery 104 through the second circuit unit 103, the battery 104 may be charged. Also, current may be supplied through the second circuit unit 103 to other hardware components within the aerosol generating device 100, such as the controller 101 and the first circuit unit 102, by discharging electric energy stored in the battery 104 under control of the second circuit unit 103.

In addition, the aerosol generating device 100 may include the temperature sensor 106. The temperature sensor 106 measures a temperature of the heater 105 and transmits temperature data to the controller 101. The controller 101 may subsequently determine whether or not an abnormality occurs in the aerosol generating device 100 by additionally considering the received temperature data.

As described above, the second circuit unit 103 may be electrically connected to the battery 104 to control charging and discharging of the battery 104.

After the charging terminal 107 is connected to the external charging device, the second circuit unit 103 may receive current from the charging terminal 107. When the second circuit unit 103 receives the current from the charging terminal 107, the aerosol generating device 100 may operate in a charging state, and the second circuit unit 103 may supply the battery 104 with the current received from the charging terminal 107, and thus, the battery 104 may be charged.

When the charging terminal 107 is not connected to the external charging device, the aerosol generating device 100 may operate in an idle state or a heating state, and the second circuit unit 103 may receive current from the battery 104 to supply current for operating other hardware components provided within the aerosol generating device 100. Here, the battery 104 is discharged. As shown in FIG. 2, the second circuit unit 103 may supply current to the controller 101 and the first circuit unit 102.

In detail, when the aerosol generating device 100 is in the heating state, the second circuit unit 103 may discharge electric energy stored in the battery 104 to allow current to flow through the controller 101 and the first circuit unit 102 so that the heater 105 may be heated according to a predesigned temperature profile.

When the aerosol generating device 100 is in the idle state, the second circuit unit 103 may discharge the electric energy stored in the battery 104 to allow current for maintaining the idle state to flow through the controller 101. In addition, the second circuit unit 103 may prevent current from flowing through the first circuit unit 102 to prevent heating of the heater 105.

When the aerosol generating device 100 is in the charging state, the second circuit unit 103 may allow current received through the charging terminal 107 to flow to the battery 104 so that the battery 104 is charged. As described above, the second circuit unit 103 may control an amount of current and a direction of current so that current received from the charging terminal 107 may flow to the battery 104. As described above, the second circuit unit 103 may control a current flow so that the battery 104 may be charged in the charging state and may control current to flow from the battery 104 to each component of the aerosol generating device 100 in the heating state and the idle state.

The second circuit unit 103 may be supplied with current through the external charging device from the charging terminal 107 electrically connected thereto. The controller 101 may determine an operating state of the aerosol generating device 100 as the charging state or the idle state by detecting whether the second circuit unit 103 is supplied with current from the external charging device.

According to embodiments, the second circuit unit 103 may include a plurality of switches. The second circuit unit 103 may control the amount of current for charging or discharging by receiving a control signal from the controller 101 and controlling on/off of the plurality of switches. According to embodiments, the second circuit unit 103 may also include at least one processor and memory storing computer code. The computer code, when executed by the at least one processor, may cause the at least one processor to perform the functions of the second circuit unit 103 (e.g. switching the plurality of switches, self-stop, etc.).

The first circuit unit 102 may operate by receiving, through the second circuit unit 103, current output from the battery 104. The first circuit unit 102 receives, from the controller 101, a signal for controlling the heater 105 to supply current to the heater 105, thereby controlling a temperature of the heater 105.

For example, the first circuit unit 102 may include a plurality of switches. The first circuit unit 102 may control current supplied to the heater 105 by receiving a control signal from the controller 101 and controlling on/off of the plurality of switches. According to embodiments, the first circuit unit 102 may also include at least one processor and memory storing computer code. The computer code, when executed by the at least one processor, may cause the at least one processor to perform the functions of the first circuit unit 102 (e.g. switching the plurality of switches, self-stop, changing data, etc.).

The first circuit unit 102 is dependent on the controller 101 but may be a component capable of actively controlling a function thereof like the controller 101. Accordingly, the first circuit unit 102 may actively control operation of the heater 105. In the heating state, the first circuit unit 102 may transmit an appropriate control signal for heating an aerosol generating material through the heater 105.

In addition, when an abnormality occurs in the controller 101, the first circuit unit 102 may self-stop operation thereof. For example, the self-stopping of the first circuit unit 102 may be performed in a method in which the first circuit unit 102 self-cuts off current flowing through the first circuit unit 102. A safety accident may be prevented even when an abnormality occurs in the controller 101, through a self-stop method in which the first circuit unit 102 self-stops operation thereof.

Current in an appropriate range for controlling the heater 105 may flow through the first circuit unit 102 in the heating state. When low current or overcurrent flows through the first circuit unit 102, the first circuit unit 102 may not control the heater 105 according to a target temperature profile.

For example, when an abnormality occurs in the first circuit unit 102, the first circuit unit 102 may not supply the heater 105 with current needed for heating an aerosol generating material. When the heater 105 is not heated, a feedback signal for heating the heater 105 to a certain temperature may be repeatedly applied. Therefore, overcurrent may flow through the first circuit unit 102, and a safety accident may occur.

In contrast, when little current flows through the first circuit unit 102, the heater 105 may not be supplied with current for heating, and thus may not sufficiently heat the aerosol generating material. Accordingly, first data about an amount of current flowing through the first circuit unit 102 may be received via periodic communication between the controller 101 and the first circuit unit 102.

In one embodiment, the first circuit unit 102 may include a current monitoring circuit capable of monitoring current flowing through the first circuit unit 102. The current monitoring circuit may be used to monitor current for determining the operating state by the controller 101.

The controller 101 performs overall control of the aerosol generating device 100 by actively controlling each hardware component. The controller 101 be a controller unit including at least one processor and a memory. According to embodiments, the memory may store computer code and the computer code, when executed by the at least one processor, may cause the at least one processor to perform the functions of the controller 101.

Referring to FIG. 2, the controller 101 controls the first circuit unit 102 and the second circuit unit 103. As described above, in the heating state, the controller 101 may control the first circuit unit 102 so that the temperature of the beater 105 may be an appropriate temperature for heating the aerosol generating material.

Also, in the non-heating state, the controller 101 may control the second circuit unit 103 to discharge current from the battery 104 or charge the battery 104 with current in the idle state or the charging state, respectively.

In addition, the controller 101 may determine the operating state of the aerosol generating device 100.

The controller 101 may monitor current flowing through the first circuit unit 102 to determine the operating state as the heating state when a current value is greater than or equal to a certain value and determine the operating state as the non-heating state when the current value is less than the certain value. The non-heating state may include the charging state or the idle state.

The controller 101 may determine the operating state of the aerosol generating device 100 as one of the charging state and the idle state, on the basis of whether or not the second circuit unit 103 is supplied with current from the external charging device.

For example, the second circuit unit 103 may be connected to the external charging device through the charging terminal 107 to be supplied with current. Current supplied from the charging terminal 107 may flow through the second circuit unit 103, and the controller 101 may determine the operating state as the charging state by detecting the current or an electric signal flowing through the second circuit unit 103. In contrast, when the controller 101 fails to detect current flowing through the second circuit unit 103 from the charging terminal 107, the controller 101 may determine the operating state of the aerosol generating device 100 as the idle state.

In addition, the controller 101 may periodically and repeatedly determine, through the first circuit unit 102 and the second circuit unit 103, whether or not an abnormality occurs in the aerosol generating device 100 by receiving first data about an amount of current and second data about an amount of current via communication with the first circuit unit 102 and the second circuit unit 103.

In detail, the controller 101 may determine the operating state of the aerosol generating device 100 by monitoring current flowing through the first circuit unit 102 and periodically determine whether or not an abnormality occurs by receiving the first data about an amount of current or the second data about an amount of current from the first circuit unit 102 or the second circuit unit 103, respectively.

For example, even when current starts to suddenly flows through the first circuit unit 102, the controller 101 may determine the operating state of the aerosol generating device 100 as the heating state and determine whether or not an abnormality occurs by receiving the first data about an amount of current.

The controller 101 may determine whether or not an abnormality occurs by identifying whether or not the first data about an amount of current received from the first circuit unit 102 exceeds a predesignated first threshold range (or value) or the second data about an amount of current received from the second circuit unit 103 exceeds a predesignated second threshold range (or value).

The controller 101 may receive temperature data of the heater 105 through the temperature sensor 106 located adjacent to the heater 105. The controller 101 may more precisely identify a hardware component, within the aerosol generating device 100, which causes an abnormality in the aerosol generating device 100, by additionally considering the temperature data when determining whether or not an abnormality occurs in the aerosol generating device 100.

For example, when the first data about an among of current, acquired by the controller 101 is within a first threshold range (e.g. a normal range) and the temperature data is not within a predesigned temperature profile (e.g. a normal range), the controller 101 may determine that a cause of an abnormality occurs in the heater 105 or the temperature sensor 106. Here, the controller 101 may provide a user with a warning of notifying a failure in the heater 105 or the temperature sensor 106.

As another example, in the case of inductive heating, even when the first data about an amount of current of the first circuit unit 102 is within the normal range but the temperature of the heater is lower than the normal range, the controller 101 may notify the user that the abnormality occurs due to disconnection of a coil or the like.

The occurrence of an abnormality in the aerosol generating device 100 may indicate that at least one hardware component within the aerosol generating device 100 does not operate or malfunctions.

When the controller 101 determines that an abnormality occurs in some or all of components of the aerosol generating device 100, the controller 101 may command various actions.

For example, the controller 101 may provide the user with a warning of notifying that an abnormality occurs in each component. When the controller 101 determines that an abnormality occurs in the first circuit unit 102, the controller 101 may stop operation of the first circuit unit 102 by cutting off current flowing through the first circuit unit 102. When the controller 101 determines that an abnormality occurs in the second circuit unit 103, the controller 101 may cut off current flowing through the second circuit unit 103. In addition, when the controller 101 determines that an abnormality occur in all of components of the aerosol generating device 100, the controller may reset the entire aerosol generating device 100.

Such a series of processes may be periodically and repeatedly performed by the controller 101, thereby preventing an abnormal state of the aerosol generating device 100 from being continuously left unattended.

FIGS. 3 through 5 are diagrams showing examples in which a cigarette is inserted into an aerosol generating device.

Referring to FIG. 3, the aerosol generating device 100 may include a battery 104, a controller 101, and a heater 105. Referring to FIGS. 4 and 5, the aerosol generating device 100 may further include a vaporizer 140. Also, the cigarette 200 may be inserted into an inner space of the aerosol generating device 100.

FIGS. 3 through 5 illustrate components of the aerosol generating device 100, which are related to the present embodiment. However, it will be understood by one of ordinary skill in the art related to the present embodiment that other general-purpose components may be further included in the aerosol generating device 100, in addition to the components illustrated in FIGS. 3 through 5.

Also, FIGS. 3 through 5 illustrate that the aerosol generating device 100 includes the heater 105. However, the heater 105 may be omitted in some embodiments.

FIG. 3 illustrates that the battery 104, the controller 101, and the heater 105 are arranged in series. Also, FIG. 4 illustrates that the battery 104, the controller 101, the vaporizer 140, and the heater 105 are arranged in series. Also, FIG. 5 illustrates that the vaporizer 140 and the heater 105 are arranged in parallel. However, the internal structure of the aerosol generating device 100 is not limited to the structures illustrated in FIGS. 3 through 5. In other words, according to the design of the aerosol generating device 100, the battery 104, the controller 101, the heater 105, and the vaporizer 140 may be differently arranged.

When the cigarette 200 is inserted into the aerosol generating device 100, the aerosol generating device 100 may operate the heater 105 and/or the vaporizer 140 to generate aerosol from the cigarette 200 and/or the vaporizer 140. The aerosol generated by the heater 105 and/or the vaporizer 140 is delivered to a user by passing through the cigarette 200.

According to some embodiments, even when the cigarette 200 is not inserted into the aerosol generating device 100, the aerosol generating device 100 may heat the heater 105.

The battery 104 may supply power to be used for the aerosol generating device 100 to operate. For example, the battery 104 may supply power to heat the heater 105 or the vaporizer 140, and may supply power for operating the controller 101. Also, the battery 104 may supply power for operations of a display, a sensor, a motor, etc. mounted in the aerosol generating device 100.

The controller 101 may generally control operations of the aerosol generating device 100. In detail, the controller 101 may control not only operations of the battery 104, the heater 105, and the vaporizer 140, but also operations of other components included in the aerosol generating device 100. Also, the controller 101 may check a state of each of the components of the aerosol generating device 100 to determine whether or not the aerosol generating device 100 is able to operate.

The controller 101 may include at least one processor. A processor can be implemented as an array of a plurality of logic gates or can be implemented as a com-bination of a general-purpose microprocessor and a memory in which a program executable in the microprocessor is stored. It will be understood by one of ordinary skill in the art that the processor can be implemented in other forms of hardware.

The heater 105 may be heated by the power supplied from the battery 104. For example, when the cigarette is inserted into the aerosol generating device 100, the heater 105 may be located outside the cigarette. Thus, the heated heater 105 may increase a temperature of an aerosol generating material in the cigarette.

The heater 105 may include an electro-resistive heater. For example, the heater 105 may include an electrically conductive track, and the heater 105 may be heated when currents flow through the electrically conductive track. However, the heater 105 is not limited to the example described above and may include all beaters which may be heated to a desired temperature. Here, the desired temperature may be pre-set in the aerosol generating device 100 or may be set as a temperature desired by a user.

As another example, the beater 105 may include an induction heater. In detail, the heater 105 may include an electrically conductive coil for heating a cigarette in an induction heating method, and the cigarette may include a susceptor which may be heated by the induction heater.

For example, the heater 105 may include a tube-type heating element, a plate-type heating element, a needle-type heating element, or a rod-type heating element, and may beat the inside or the outside of the cigarette 200, according to the shape of the heating element.

Also, the aerosol generating device 100 may include a plurality of heaters 105. Here, the plurality of heaters 105 may be inserted into the cigarette 200 or may be arranged outside the cigarette 200. Also, some of the plurality of heaters 105 may be inserted into the cigarette 200 and the others may be arranged outside the cigarette 200. In addition, the shape of the heater 105 is not limited to the shapes illustrated in FIGS. 3 through 5 and may include various shapes.

The vaporizer 140 may generate aerosol by heating a liquid composition and the generated aerosol may pass through the cigarette 200 to be delivered to a user. In other words, the aerosol generated via the vaporizer 140 may move along an air flow passage of the aerosol generating device 100 and the air flow passage may be configured such that the aerosol generated via the vaporizer 140 passes through the cigarette to be delivered to the user.

For example, the vaporizer 140 may include a liquid storage, a liquid delivery element, and a heating element, but it is not limited thereto. For example, the liquid storage, the liquid delivery element, and the heating element may be included in the aerosol generating device 100 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 140 or may be formed in-tegrally with the vaporizer 140.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the beating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 140 may be referred to as a cartomizer or an atomizer, but it is not limited thereto.

The aerosol generating device 100 may further include general-purpose components in addition to the battery 104, the controller 101, the heater 105, and the vaporizer 140. For example, the aerosol generating device 100 may include a display capable of outputting visual information and/or a motor for outputting haptic information. Also, the aerosol generating device 100 may include at least one sensor (a puff detecting sensor, a temperature detecting sensor, a cigarette insertion detecting sensor, etc.). Also, the aerosol generating device 100 may be formed as a structure that, even when the cigarette 200 is inserted into the aerosol generating device 100, may introduce external air or discharge internal air.

Although not illustrated in FIGS. 3 through 5, the aerosol generating device 100 and an additional cradle may form together a system. For example, the cradle may be used to charge the battery 104 of the aerosol generating device 100. Alternatively, the heater 105 may be heated when the cradle and the aerosol generating device 100 are coupled to each other.

The cigarette 200 may be similar to a general combustive cigarette. For example, the cigarette 200 may be divided into a first portion including an aerosol generating material and a second portion including a filter, etc. Alternatively, the second portion of the cigarette 200 may also include an aerosol generating material. For example, an aerosol generating material made in the form of granules or capsules may be inserted into the second portion.

The entire first portion may be inserted into the aerosol generating device 100, and the second portion may be exposed to the outside. Alternatively, only a portion of the first portion may be inserted into the aerosol generating device 100, or the entire first portion and a portion of the second portion may be inserted into the aerosol generating device 100. The user may puff aerosol while holding the second portion by their mouth. In this case, the aerosol is generated by the external air passing through the first portion, and the generated aerosol passes through the second portion and is delivered to the user's mouth.

For example, the external air may flow into at least one air passage formed in the aerosol generating device 100. For example, opening and closing of the air passage and/or a size of the air passage formed in the aerosol generating device 100 may be adjusted by the user. Accordingly, the amount of smoke and a smoking impression may be adjusted by the user. As another example, the external air may flow into the cigarette 200 through at least one hole formed in a surface of the cigarette 200.

FIG. 6 is a diagram illustrating an example of an aerosol generating system using an induction heating method, according to one embodiment.

Referring to FIG. 6, an aerosol generating device 100 includes a battery 104, a controller 101, an induction coil 601, and a susceptor 602. Also, at least a portion of a cigarette 200 may be accommodated in a cavity 603 of the aerosol generating device 100.

The aerosol generating device 100 shown in FIG. 6 shows some components related to the present embodiment. However, it may be understood by one of ordinary skill in the art related to the present embodiment that the aerosol generating device 100 may further include other general-purpose components in addition to the components shown in FIG. 6.

The induction coil 601 may be located around the cavity 603. FIG. 6 illustrates that the induction coil 601 is arranged to surround the susceptor 602 and the cavity 603, but the induction coil 601 is not limited thereto.

When the cigarette 200 is accommodated in the cavity 603 of the aerosol generating device 100, the aerosol generating device 100 may supply power to the induction coil 601 so that the induction coil 601 generates an alternating magnetic field. As the alternating magnetic field generated by the induction coil 601 may pass through the susceptor 602, the susceptor 602 may be heated. As an aerosol generating material within the cigarette 200 is heated by the susceptor 602 that is heated, an aerosol may be generated. The generated aerosol is delivered to a user by passing through the cigarette 200.

The battery 104 supplies power used for operating the aerosol generating device 100. For example, the battery 104 may supply power so that the induction coil 601 may generate the alternating magnetic field and supply power for operating the controller 101. Also, the battery 104 may supply power for operating a display, a sensor, a motor, and the like installed in the aerosol generating device 100.

The controller 101 controls overall operation of the aerosol generating device 100. In detail, the controller 101 controls operations of other components included in the aerosol generating device 100 as well as operations of the battery 104 and the induction coil 601. Also, the controller 101 may determine whether or not the aerosol generating device 100 is in an operable state by identifying a state of each of the components of the aerosol generating device 100.

The induction coil 601 may be an electrically conductive coil that generates an alternating magnetic field by power supplied from the battery 104. The induction coil 601 may be arranged to surround at least a portion of the cavity 603. The alternating magnetic field generated by the induction coil 601 may be applied to the susceptor 602 arrange at an inner end of the cavity 603.

The susceptor 602 may be heated as the alternating magnetic field generated by the induction coil 601 passes therethrough and may include metal or carbon. For example, the susceptor 602 may include at least one of ferrite, a ferromagnetic alloy, stainless steel, and aluminum.

Also, the susceptor 602 may include at least one from among ceramic such as graphite, molybdenum, silicon carbide, niobium, a nickel alloy, a metal film, or zirconia, transition metal such as nickel (Ni) or cobalt (Co), and metalloid such as boron (B) or phosphorus (P). However, the susceptor 602 is not limited to the example described above and may be applicable, without limitations, to all susceptors that may be heated to a wanted temperature as an alternating magnetic field is applied. Here, the wanted temperature may be preset in the aerosol generating device 100 or may be set to a temperature wanted by a user.

When the cigarette 200 is accommodated in the cavity 603 of the aerosol generating device 100, the susceptor 602 may be located inside the cigarette 200. Accordingly, the susceptor 602 that is heated may increase a temperature of an aerosol generating material within the cigarette 200.

FIG. 6 illustrates that the susceptor 602 is inserted into the cigarette 200, but the susceptor 602 is not limited thereto. For example, the susceptor 602 may include a tube-shaped heating element, a plate-shaped heating element, a needle-shaped heating element, or a rod-shaped beating element and may heat the inside or outside of the cigarette 200 according to a shape of a heating element.

Also, a plurality of susceptors 602 may be arranged in the aerosol generating device 100. Here, the plurality of susceptors 602 may be arranged to be inserted into the cigarette 200 or may be arranged outside the cigarette 200. Also, some of the plurality of susceptors 602 may be arranged to be inserted into the cigarette 200, and the others may be arranged outside the cigarette 200. In addition, the shape of the susceptor 602 is not limited to the shape shown in FIG. 6, and the susceptor 602 may be manufactured in various shapes.

Hereinafter, an example of the cigarette 200 will be described with reference to FIG. 7.

FIG. 7 illustrates an example of the cigarette.

Referring to FIG. 7, the cigarette 200 may include a tobacco rod 210 and a filter rod 220. The first portion described above with reference to FIGS. 3 through 5 may include the tobacco rod 210, and the second portion may include the filter rod 220.

FIG. 7 illustrates that the filter rod 220 includes a single segment. However, the filter rod 220 is not limited thereto. In other words, the filter rod 220 may include a plurality of segments. For example, the filter rod 220 may include a first segment configured to cool an aerosol and a second segment configured to filter a certain component included in the aerosol. Also, according to embodiments, the filter rod 220 may further include at least one segment configured to perform other functions.

The cigarette 200 may be packaged using at least one wrapper 240. The at least one wrapper 240 may have at least one hole through which external air may be introduced or internal air may be discharged. For example, the cigarette 200 may be packaged by one wrapper 240. As another example, the cigarette 200 may be doubly packaged by two or more wrappers 240. For example, the tobacco rod 210 may be packaged by a first wrapper, and the filter rod 220 may be packaged by a second wrapper. Also, the tobacco rod 210 and the filter rod 220, which are respectively packaged by separate wrappers, may be coupled to each other, and the entire cigarette 200 may be packaged by a third wrapper. When each of the tobacco rod 210 or the filter rod 220 is composed of a plurality of segments, each segment may be packaged by separate wrappers. Also, the entire cigarette 200 including the plurality of segments, which are respectively packaged by the separate wrappers and which are coupled to each other, may be re-packaged by another wrapper.

The tobacco rod 210 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 210 may include other additives, such as flavors, a wetting agent, and/or organic acid. Also, the tobacco rod 210 may include a flavored liquid, such as menthol or a moisturizer, which is injected to the tobacco rod 210.

The tobacco rod 210 may be manufactured in various forms. For example, the tobacco rod 210 may be formed as a sheet or a strand. Also, the tobacco rod 210 may be formed as a pipe tobacco, which is formed of tiny bits cut from a tobacco sheet. Also, the tobacco rod 210 may be surrounded by a heat conductive material. For example, the heat-conducting material may be, but is not limited to, a metal foil such as aluminum foil. For example, the heat conductive material surrounding the tobacco rod 210 may uniformly distribute heat transmitted to the tobacco rod 210, and thus, the heat conductivity applied to the tobacco rod may be increased and taste of the tobacco may be improved. Also, the beat conductive material surrounding the tobacco rod 210 may function as a susceptor heated by the induction heater. Here, although not illustrated in the drawings, the tobacco rod 210 may further include an additional susceptor, in addition to the heat conductive material surrounding the tobacco rod 210.

The filter rod 220 may include a cellulose acetate filter. Shapes of the filter rod 220 are not limited. For example, the filter rod 220 may include a cylinder-type rod or a tube-type rod having a hollow inside. Also, the filter rod 220 may include a recess-type rod. When the filter rod 220 includes a plurality of segments, at least one of the plurality of segments may have a different shape.

The filter rod 220 may be formed to generate flavors. For example, a flavoring liquid may be injected onto the filter rod 220, or an additional fiber coated with a flavoring liquid may be inserted into the filter rod 220.

Also, the filter rod 220 may include at least one capsule 230. Here, the capsule 230 may generate a flavor or an aerosol. For example, the capsule 230 may have a configuration in which a liquid containing a flavoring material is wrapped with a film. For example, the capsule 230 may have a spherical or cylindrical shape, but is not limited thereto.

When the filter rod 220 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described example and is not limited as long as the cooling segment cools the aerosol.

Meanwhile, although not illustrated in FIG. 7, the cigarette 200 according to an embodiment may further include a front-end filter. The front-end filter may be located on one side of the tobacco rod 210 which is opposite to the filter rod 220. The front-end filter may prevent the tobacco rod 210 from being detached outwards and prevent the liquefied aerosol from flowing from the tobacco rod 210 into the aerosol generating device 100 (refer to FIGS. 3 through 6), during smoking.

FIG. 8 is a flowchart of determining whether or not an aerosol generating device is abnormal, on the basis of first data about an amount of current or second data about an amount of current, according to one embodiment.

In operation 810, a controller (e.g. controller 101) may determine whether a current operating state of an aerosol generating device (e.g. aerosol generating device 100) is a heating state or a non-beating state.

When the controller determines that an amount of current greater than or equal to a certain value flows through a first circuit unit (e.g. first circuit unit 102), the controller may determine the operating state of the aerosol generating device as the heating state. Also, when the controller detects that an amount of current less than the certain value flows through the first circuit unit, the controller may determine the operating state as the non-heating state.

According to one embodiment, the aerosol generating device may further include a cigarette insertion sensor for detecting that a cigarette is inserted. The cigarette insertion sensor detects that the cigarette is inserted and then transmits a detection signal to the controller, and the controller controls a second circuit unit (e.g. second circuit unit 103) in response to receiving the detection signal so that current from a battery (e.g. battery 104) is applied to the first circuit unit. When the amount of current greater than or equal to the certain value flows through the first circuit unit, the controller may detect the same and determine the operating state of the aerosol generating device as the heating state.

According to another embodiment, the aerosol generating device may further include a user interface for receiving an input of a user. The controller may receive an input signal from the user interface. The controller controls the second circuit unit in response to receiving the input signal so that the current from the battery is applied to the first circuit unit. When the amount of current greater than or equal to the certain value flows through the first circuit unit, the controller may detect the same and determine the operating state of the aerosol generating device as the heating state.

When the operating state of the aerosol generating device is determined as the heating state, the controller proceeds to operation 820. When the operating state of the aerosol generating device is determined as the non-heating state, the controller proceeds to operation 840.

When the operating state is the beating state, in operation 820, the controller may receive first data about an amount of current flowing through the first circuit unit.

When the operating state of the aerosol generating device is determined as the heating state, the controller may determine that the first circuit unit is a main communication target. In the heating state, the controller may periodically receive the first data about an amount of current of the first circuit unit to determine the occurrence of an abnormality in the aerosol generating device due to the first circuit unit.

When the operating state is the heating state, in operation 830, the controller may additionally receive temperature data from a temperature sensor (e.g. temperature sensor 106). Operation 830 may be a selective operation and the controller may additionally consider the temperature data when determining whether or not an abnormality occurs in the aerosol generating device.

When the operating state is the non-heating state, in operation 840, the controller acquires second data about an amount of current flowing through the second circuit unit. When the operating state of the aerosol generating device is determined as the non-heating state, the controller may determine the second circuit unit is the main communication target. In the non-heating state, the controller may periodically receive the second data about an amount of current of the second circuit unit to determine the occurrence of an abnormality in the aerosol generating device due to the second circuit unit.

When the operating state is the heating state, in operation 850, the controller may determine whether or not the abnormality occurs in the aerosol generating device, on the basis of the first data about an amount of current.

In detail, the controller may compare the first data about an amount of current with a first threshold range that is a current amount range expected in the heating state and, when the first data about an amount of current exceeds the first threshold range, determine that the abnormality occurs in the aerosol generating device.

According to one embodiment, the controller may determine whether or not the abnormality occurs in the aerosol generating device, on the basis of the first data about an amount of current and the temperature data. For example, the controller may determine which component of the first circuit unit and a heater has an abnormality in the heating state by additionally receiving the temperature data of the heater from the temperature sensor.

When the controller does not consider the temperature data together, the controller may not detect whether or not an abnormality occurs in the heater and may detect only whether or not an abnormality occurs in the first circuit unit. However, the controller may more precisely determine whether or not an abnormality occurs, in the heating state by additionally considering the temperature data.

When the operating state is the non-heating state, in operation 850, the controller may determine whether or not the abnormality occurs in the aerosol generating device, on the basis of the second data about an amount of current. In detail, the controller may compare the second data about an amount of current with a second threshold range that is a current amount range expected in the non-heating state and, when the second data about an amount of current exceeds the second threshold range, determine that the abnormality occurs in the aerosol generating device.

The controller may periodically monitor the second data about an amount of current both when a current state of the aerosol generating device is a charging state and when the current state is an idle state. In the charging state and the idle state, the second threshold range of the second data about an amount of current may be differently designated.

For example, in the charging state, current may be supplied through a charging terminal. Therefore, a larger amount of current may be expected to flow through the second circuit unit in the charging state than in the idle state. Accordingly, the second threshold range may be designated higher in the charging state than in the idle state.

As described above, the aerosol generating device may be safely protected from potential hazardous accidents in all operating states by periodically receiving the second data about an amount of current in idle state as well as in the charging state and comparing the second data about an amount of current with the second threshold range designated to be appropriate for the idle state.

In operation 850, the first data about an amount of current or the second data about an amount of current may be simply compared with the first threshold range or the second threshold range, respectively, and the temperature data may be additionally considered as described with reference to FIG. 2.

For example, the case where the temperature data is within a normal range, but overcurrent flows through the first circuit unit such that the first data about an amount of current exceeds the first threshold range, may indicate that the first circuit unit malfunctions.

As another example, the case where the first data about an amount of current is within the first threshold range but the temperature data does not reach a beating temperature range may indicate that the heater is supplied with sufficient current from the first circuit unit but fails to be heated and malfunctions.

As another example, the case where, in the case of induction heating, the first circuit unit operates normally and the first data about an amount of current is included in the first threshold range, but a temperature of a susceptor does not increase may indicate a disconnection occurs in an induction coil.

As another example, the case where the second circuit unit is in the charging state, but the battery is not charged and only the consumption of current increases may indicate the malfunction of the second circuit unit.

As another example, even though the second circuit unit is in the idle state, more current than needed flows from the battery, and thus, overcurrent in the idle state may flow through the second circuit unit. In such case, the second data about an amount of current exceeds the second threshold range which may indicate that the second circuit unit malfunctions.

When the controller determines that the abnormality occurs in the aerosol generating device, according to the series of processes, in operation 860, the controller may command various actions such as resetting of the aerosol generating device, stopping of operation of the first circuit unit, cutting off of current of the battery, and a notification of a warning for a user.

In detail, when overcurrent flows through the first circuit unit in the heating state, the controller may cut off an electric connection to the second circuit unit or the battery so that current is not applied to the first circuit unit, to stop operation of the first circuit unit.

According to one embodiment, when an abnormality occurs in the controller, the controller may initialize states of all hardware components inside the aerosol generating device to reset the aerosol generating device.

According to one embodiment, when overcurrent flows through the second circuit unit in the non-heating state, the controller may cut off an electric connection to the battery or the charging terminal to prevent current from being applied to the second circuit unit, thereby blocking current from flowing to the second circuit unit.

Also, the aerosol generating device may also provide a warning notification to the user. According to one embodiment, to provide a warning notification to the user, the aerosol generating device may further include a user interface, a light emitting diode (LED), or a vibration motor so that it may display a warning indication through the user interface, flash the LED, or make a vibration to notify a corresponding warning. However, the warning notification is not limited thereto, and it may be understood by one of ordinary skill in the art related to present embodiments that other notification methods may be further included in addition to the above example notification methods.

In detail, when the heater is overheated even though the first data about an amount of current corresponds to the designated first threshold range in the heating state, the controller may control the second circuit unit to cut off current flowing through the first circuit unit so that the first circuit unit may not heat the heater any more, and may provide a heater overheat warning notification to the user.

Also, when the first data about an amount of current of the first circuit unit exceeds the first threshold range even though the temperature of the heater does not increase, the controller may stop operation of the first circuit unit. In the case of the induction heating, when overcurrent is applied to an induction coil without generating induction current, the controller may provide the user with a notification of a disconnection or abnormality of the induction coil.

In addition, when charging is not normally performed even though the second data about an amount of current falls within the designated second threshold range in the charging state, the aerosol generating device may determine that an abnormality occurs in the battery and provide a warning of notifying that the battery fails to the user.

According to one embodiment, when the second data about an amount of current does not fall within the designated second threshold range in the charging state or the second data about an amount of current does not fall within the second threshold range, which is designated as a range different from the charging state, in the idle state, the aerosol generating device may determine that an abnormality occurs in the second circuit unit and may provide a warning of notifying that the second circuit unit fails to the user.

Also, when the second data about an amount of current flowing through the second circuit unit has a value lower than the second threshold range in the charging state, charging may not be appropriately performed. In contrast, when the second data about an amount of current has a value higher than the second threshold range, an abnormality may occur in the battery due to overcharging. The aerosol generating device may cut off current flowing from the second circuit unit to the battery to prevent the malfunction of the battery as described above.

Also, when charging is not performed, and only the second data about an amount of current is measured high, the aerosol generating device may provide a battery replacement notification signal to the user or may cut off current flowing from the charging terminal to the second circuit unit.

In addition, when the second data about an amount of current flowing through the second circuit unit is higher than the second threshold range in the idle state, more current than needed may flow from the battery to other hardware components of the aerosol generating device including the controller, the first circuit unit, the heater, and the like. Therefore, the aerosol generating device may cut off current flowing from the second circuit unit to other components or may provide the user with a signal for notifying a failure in the second circuit unit.

FIG. 9 is a flowchart of determining whether or not an aerosol generating device is abnormal, on the basis of a result of communication, according to one embodiment.

In operation 910, an aerosol generating device may operate normally and may correspond to a case where an abnormality does not occur in periodic current amount monitoring or communication monitoring through data.

In operation 910, the controller may determine whether or not a current operating state is a heating state or a non-heating state. Whether the current operating state is the heating state or the non-beating state may be determined by the controller as described.

When the operating state is the heating state, in operation 920, the controller may input first data to a first circuit unit. When the controller is not abnormal, the first data is input to the first circuit unit. When an abnormality occurs in the controller, the first data is not input to the first circuit unit.

After the controller inputs the first data to the first circuit unit, in operation 930, the controller may read second data from the first circuit unit after a certain time elapses. When the first circuit unit operates normally, the first circuit unit may receive the first data from the controller and then, after a certain time elapses, may change the first data to the second data. The detailed description thereof will be given later with reference to FIG. 10.

In operation 940, the controller may compare whether or not the first data and the second data are the same. When the first data and the second data are the same, the controller may move to operation 950. The case where the first data and the second data are not the same indicates that the first circuit unit changes the first data to the second data. Therefore, the controller may determine that the first circuit unit operates normally and returns to operation 910. In other words, the case where the first data and the second data are not the same may be understood that both the controller and the first circuit unit operate normally.

The case where the first data and the second data are the same may be understood that the first circuit unit fails to change the first data to the second data. Therefore, in operation 950, the controller may determine that an abnormality occurs in the first circuit unit and stop operation of the first circuit unit.

The case where the controller fails to input the first data to the first circuit in operation 920 may be understood that the controller malfunctions. Therefore, the failure of inputting the first data to the first circuit unit may be determined as occurring due to the occurrence of an abnormality in the controller.

When the abnormality occurs in the controller, the first circuit unit may not receive a command from the controller to stop operation thereof. Therefore, the first circuit may self-stop operation thereof to prevent a safety accident such as overheating of a heater or overcurrent of the first circuit unit.

Operations 970 through 990 may be performed in the same method as in operations (operations 840, 850, and 860) for the non-heating in the flowchart of FIG. 8.

FIG. 10 is a conceptual diagram for explaining a communication method between a controller and a first circuit unit, according to one embodiment.

A controller 101 periodically inputs first data 1020 to a first circuit unit 102 (step 1010). Both the controller 101 and the first circuit unit 102 actively perform control functions. However, the controller 101 and the first circuit unit 102 may have a rela-tionship as a master device and a slave device, respectively.

The master device may be a subject of operation in performing one task and control slave devices. In contrast, the slave device may be a device subordinate to the master device and perform operation thereof by receiving an instruction from the master device.

In other words, the controller 101 may control the first circuit unit 102, but the first circuit unit 102 may not control the controller 101. For example, the controller 101 may input data to the first circuit unit 102 (step 1010) or may read data from the first circuit unit 102 (step 1050). However, the first circuit unit 102 may not input data to the controller 101 or may not read data from the controller 101.

The first data 1020 may be data used to periodically identify whether or not communication with the first circuit unit 102 is appropriately performed. The first circuit unit 102 that receives the first data 1020 transmitted from the controller 101 may data-change the first data 1020 to second data 1040 different from the first data 1020.

The data change process (step 1030) may be a process for the controller 101 to read the second data 1040 (step 1050) to determine whether or not the second data 1040 is the same as the first data 1020.

The method of changing data by the first circuit unit 102 (step 1030) is referred to as a toggle method. For example, input data may be changed, through the toggle method, to other data that is one bit different from the input data. The controller 101 may continuously compare whether or not changed data and input data are the same, thereby easily identifying whether or not communication between circuits is performed correctly by consuming only a small amount of power.

In other words, when the controller 101 operates normally without an abnormality, the controller 101 may periodically input the first data 1020 to the first circuit unit 102 (step 1010). When an abnormality occurs in the controller 101, the first circuit unit 102 does not receive the first data 1020. Therefore, whether or not the abnormality occurs in the controller 101 may be indirectly identified through the first circuit unit 102.

In contrast, when the first circuit unit 102 operates normally without an abnormality, the first circuit unit 102 may periodically data-change the first data 1020 to the second data 1040 different from the first data 1020 (step 1030). (The second data is expressed as S2 in FIG. 10. However, data change fails, the second data may substantially refer to data that is the same as the first data, which is expressed as S1 in FIG. 10.)

Whether or not the first circuit unit 102 appropriately performs data change (step 1030) may be indirectly identified by the controller 101 reading data from the first circuit unit 102 (1050) to determine whether or not the first data 1020 and the second data 1040 are the same by comparing the first data 1020 and the second data 1040.

For example, when the first data 1020 is different from the second data 1040, the first circuit unit 102 may be recognized as operating normally. Also, when the first data 1020 is different from the second data 1040, the first circuit unit 102 fails to change data (step 1030). Therefore, the first circuit unit 102 may be recognized as not operating normally.

As described above, the controller 101 and the first circuit unit 102 may identify whether or not an abnormality occurs with each other, through periodic data communication between the controller 101 and the first circuit unit 102.

In other words, when an abnormality occurs in the controller 101, the first circuit unit 102 may self-stop operation thereof. When an abnormality occurs in the first circuit unit 102, the controller 101 may stop operation of the first circuit unit 102 to prevent in advance abnormal overheating or overcurrent of a heater 105.

One embodiment may also be implemented in the form of a recording medium including instructions executable by a computer, such as a program module executable by the computer. The computer-readable recording medium may be any available medium that can be accessed by a computer and includes both volatile and nonvolatile media, and removable and non-removable media. In addition, the computer-readable recording medium may include both a computer storage medium and a communication medium. The computer storage medium includes all of volatile and nonvolatile, and removable and non-removable media implemented by any method or technology for storage of information such as computer-readable instructions, data structures, program modules or other data. The communication medium may include computer-readable instructions, data structures, other data in modulated data signals such as program modules, or other transmission mechanisms, and includes any information transfer media.

Those of ordinary skill in the art related to embodiments of the present disclosure may understand that various changes in form and details can be made therein without departing from the scope of the disclosure. The disclosed methods should be considered in a descriptive sense only and not for purposes of limitation.

The invention claimed is:

1. An aerosol generating device comprising:
a heater configured to heat an aerosol generating material to generate an aerosol;
a battery configured to supply power to the heater;
a controller;
a first circuit unit separately provided from the controller and configured to control operation of the heater; and
a second circuit unit configured to control charging and discharging of the battery, wherein the controller is configured to:
determine an operating state of the aerosol generating device as one from among a heating state and a non-heating state,
based on determining the operating state as the heating state, receive first data about an amount of first current flowing through the first circuit unit, and determine an abnormality in the first circuit unit based on the first data about the amount of the first current, and
based on determining the operating state as the non-heating state, receive second data about an amount of second current flowing through the second circuit unit, and determine an abnormality in the second circuit unit based on the second data about the amount of the second current.

2. The aerosol generating device of claim 1, wherein the controller is further configured to monitor whether an amount of current greater than or equal to a predetermined value is flowing through the first circuit unit and, based on a result of the monitoring, determine the operating state of the aerosol generating device as one from among the heating state and the non-heating state.

3. The aerosol generating device of claim 1, wherein the controller is further configured to:
determine the abnormality in the first circuit unit by comparing the first data with a first threshold value or range, and
determine the abnormality in the second circuit unit by comparing the second data with a second threshold value or range.

4. The aerosol generating device of claim 3, wherein the controller is further configured to, in determining that the operating state is the non-heating state, determine that the operating state is one from among a charging state and an idle state, and
the controller is further configured to designate the second threshold value or range differently when the operating state is determined to be the charging state as compared to when the operating state is determined to be the idle state.

5. The aerosol generating device of claim 1, further comprising:
a temperature sensor configured to measure a temperature of the heater,
wherein the controller is further configured to, based on determining the operating state is the heating state, acquire temperature data from the temperature sensor and determine the abnormality in the first circuit unit, based on the first data and the temperature data.

6. The aerosol generating device of claim 1, wherein the controller is further configured to, based on determining that the abnormality has occurred in the first or second circuit unit, give a command to provide a warning notification, to stop operation of the first circuit unit, or to reset the aerosol generating device.

7. The aerosol generating device of claim 1, wherein the controller is further configured to communicate with the first circuit unit by inputting third data to the first circuit unit and then, after a certain time has elapsed, read fourth data from the first circuit unit.

8. The aerosol generating device of claim 7, wherein the controller is further configured to:
compare the third data input to the first circuit unit and the fourth data read from the first circuit unit, and
based on the third data and the fourth data being the same, determine that the abnormality has occurred in the first circuit unit and stop operation of the first circuit unit.

9. The aerosol generating device of claim 7, wherein the first circuit unit is further configured to, based on not receiving the third data from the controller, determine that an abnormality has occurred in the controller and self-stop operation of the first circuit unit.

10. A method of controlling an aerosol generating device including a heater configured to heat an aerosol generating material to generate an aerosol; a battery configured to supply power to the heater; a controller; a first circuit unit separately provided from the controller and configured to control operation of the heater; and a second circuit unit configured to control charging and discharging of the battery, the method comprising:
determining, by the controller, an operating state of the aerosol generating device as one from among a heating state and a non-heating state,
based on determining the operating state as the heating state, receiving, by the controller, first data about an amount of first current flowing through the first circuit unit, and determining an abnormality in the first circuit unit based on the first data about the amount of the first current, and
based on determining the operating state as the non-heating state, receiving, by the controller, second data about an amount of second current flowing through the second circuit unit, and determining an abnormality in the second circuit unit based on the second data about the amount of the second current.

11. The method of claim 10, further comprising:
giving, based on determining that the abnormality has occurred in the first or second circuit unit, a command to provide a warning notification, to stop operation of the first circuit unit, or to reset the aerosol generating device.

12. The method of claim 10, wherein
the communicating based on determining that the operating state is the heating state or the non-heating state comprises:
inputting third data to the first circuit unit; and
communicating with the first circuit unit by reading fourth data from the first circuit unit after a certain time has elapsed.

13. The method of claim 12, further comprising:
comparing the third data input to the first circuit unit and the fourth data read from the first circuit unit; and
determining that the abnormality has occurred in the first circuit unit and stopping operation of the first circuit unit, based on the third data and the fourth data being the same.

* * * * *